United States Patent
You (10) Patent No.: US 7,304,697 B2
(45) Date of Patent: Dec. 4, 2007

(54) LIQUID CRYSTAL DISPLAY DEVICE USING LIGHT EMITTING DIODE

(75) Inventor: Tae Ho You, Incheon (KR)

(73) Assignee: LG.Philips LCD Co., Ltd., Seoul (KR)

( * ) Notice: Subject to any disclaimer, the term of this patent is extended or adjusted under 35 U.S.C. 154(b) by 119 days.

(21) Appl. No.: 10/873,115

(22) Filed: Jun. 23, 2004

(65) Prior Publication Data

US 2004/0262623 A1    Dec. 30, 2004

(30) Foreign Application Priority Data

Jun. 24, 2003    (KR)    ............ 10-2003-0041115

(51) Int. Cl.
*G02F 1/1335*    (2006.01)
(52) U.S. Cl. ............................................. 349/69
(58) Field of Classification Search .......... 349/61, 349/69; 362/97
See application file for complete search history.

(56) References Cited

U.S. PATENT DOCUMENTS 6,573,653 B1 *    6/2003    Ishinaga ............... 313/512
6,995,510 B2 *    2/2006    Murakami et al. ......... 313/512
2003/0107316 A1    6/2003    Murakami
2004/0130515 A1 *    7/2004    Chuang et al. ............ 345/82

FOREIGN PATENT DOCUMENTS

| CN | 2161938 Y | 4/1994 |
|---|---|---|
| DE | 693 16 010 T2 | 6/1998 |
| EP | 1 087 447 A1 | 3/2001 |
| JP | 10-022529 | 1/1998 |

* cited by examiner

*Primary Examiner*—James A. Dudek
(74) *Attorney, Agent, or Firm*—McKenna Long & Aldridge LLP

(57) ABSTRACT

A liquid crystal display device using a light emitting diode includes a light emitting diode and a radiation plate having an asymmetric shape for making outgoing angle ranges of light exiting from the LED chip different depending on which portion of the asymmetric shaped radiation plate reflected the light.

20 Claims, 11 Drawing Sheets

LIQUID CRYSTAL DISPLAY DEVICE USING LIGHT EMITTING DIODE

This application claims the benefit of the Korean Patent Application No. P2003-41115 filed in Korea on Jun. 24, 2003, which is hereby incorporated by reference.

BACKGROUND OF THE INVENTION

1. Field of the Invention

The present invention relates to a liquid crystal display device using a light emitting diode, and more particularly, a liquid crystal display device using a light emitting diode as a light source in the liquid crystal display device.

2. Description of the Related Art

Generally, a liquid crystal display (hereinafter, referred to as LCD) displays a desired picture on a screen by controlling the transmittance of the light supplied from a backlight unit by using a liquid crystal display panel including a plurality of liquid crystal cells arranged in a matrix and a plurality of control switches to switch video signals to be supplied to each of the liquid crystal cells. The trend in back light technology is toward miniaturization, thin profile and lightweight. In accordance with this trend, a light emitting diode (LED), which has the advantages of low power consumption, light weight and high luminance, has been suggested for use as a back light unit instead of a fluorescent lamp.

Figure 1:
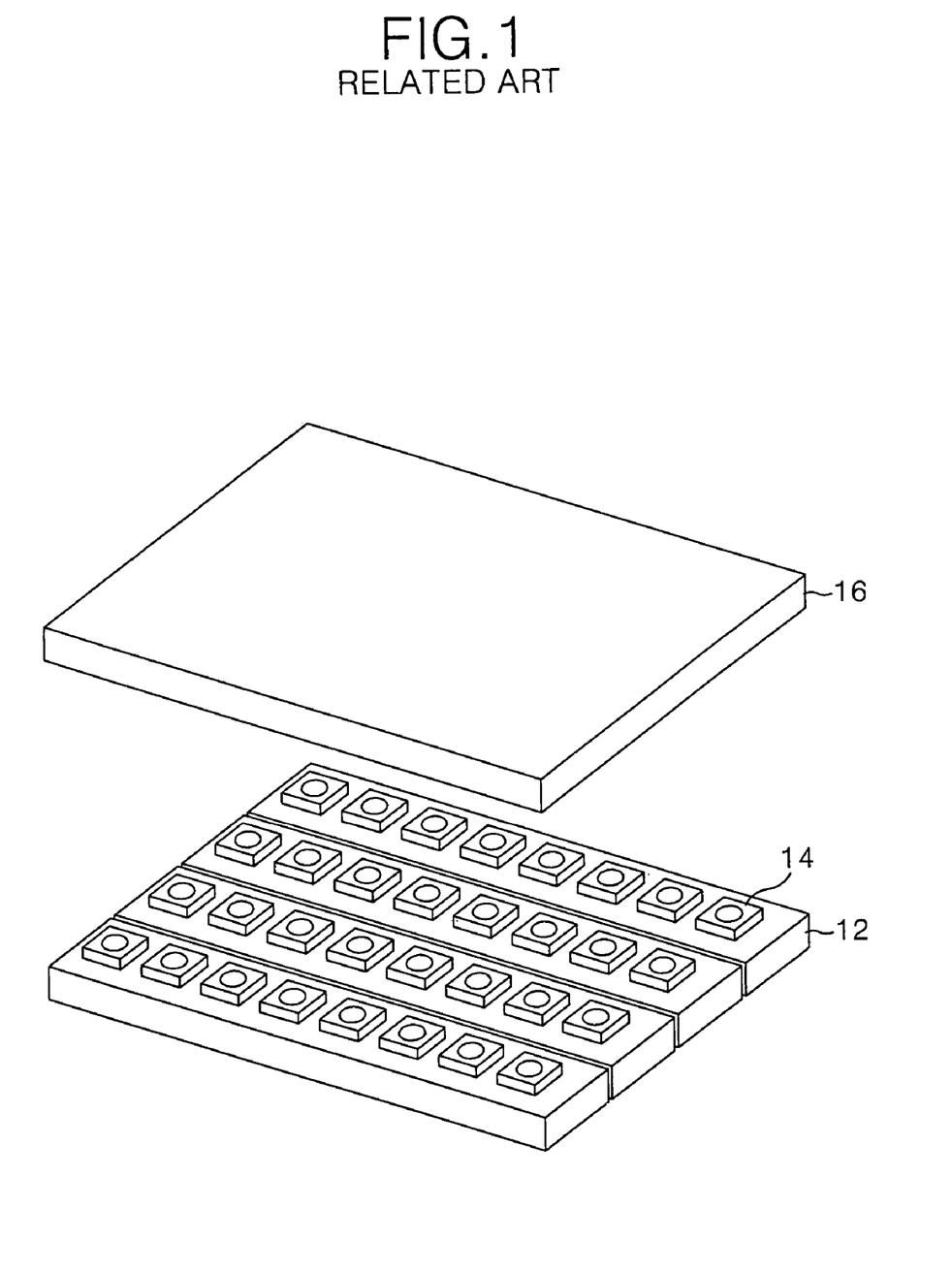
FIG. 1 is a perspective view of a direct back light unit using a light emitting diodes according to a related art.
Figure 2:
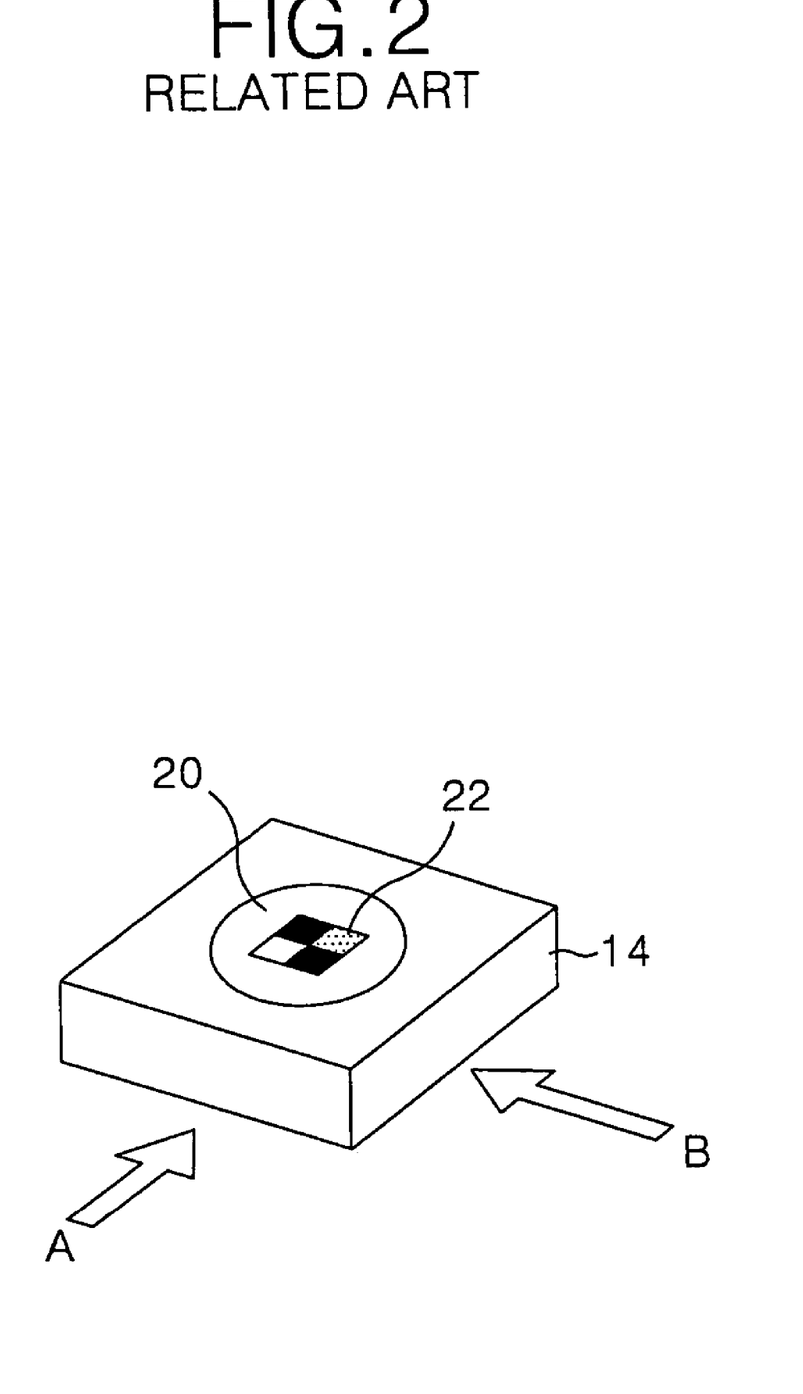
FIG. 2 is a perspective view of a light emitting diode package shown in FIG. 1.

FIG. 1 is a perspective view of a direct back light unit using a light emitting diode according to a related art. Referring to FIG. 1, a direct back light unit using a LED in a LCD according to a related art comprises a plurality of LED packages 14 generating light, a printed circuit board (PCB) 12 in which a plurality of the LED package 14 is mounted at an identical interval and a diffusion plate 16 diffusing the light emitted from the LED packages 14. FIG. 2 is a perspective view of a light emitting diode package shown in FIG. 1.

As shown in FIG. 2, each of the LED packages 14 includes a LED chip 22 for generating light, a radiation plate 20, which is formed on the front surface of the LED chip 22 to reflect the light generated from the LED chip 22 outward, and a mold material for packaging the LED chip 22 and the radiation plate 20. The mold material (not shown) surrounds the LED chip 22 and the radiation plate 20 to protect the LED chip 22 and the radiation plate 20. The LED chip 22 generates red light, green light and blue light, or white light as a point light source. Such a LED chip 22 has a red LED, a green LED and a blue LED to generate the red light, green light and blue light, or white light. The radiation plate 20 formed on the front surface of the LED chip 22 has a circular shape. The circular-shaped radiation plate 20 reflect lights emitted by the LED chip with a consistent set angle ranges with respect to all axes of the circular-shaped radiation plate 20.

The PCB 12 is made of metal to disperse heat generated when driving a plurality of the LED chips 22. A controller (not shown) for controlling luminescence of the LED chips 22 is mounted on the PCB 12. The PCB 12 supports the LED chips 22.

The diffusion plate 16 is spaced at a designated interval from the LED package 14 so that the light radiated from the LED package 14 through the diffusion plate 16 onto a liquid crystal panel (not shown) has a uniform distribution. Thus, the diffusion plate 16 directs the light radiated from the LED package 14 toward a liquid crystal panel (not shown) and causes a wide angle range of light incident onto the liquid crystal panel. The diffusion plate 16 includes a transparent resin film whose sides are coated with light-diffusion materials.

Figure 3A:
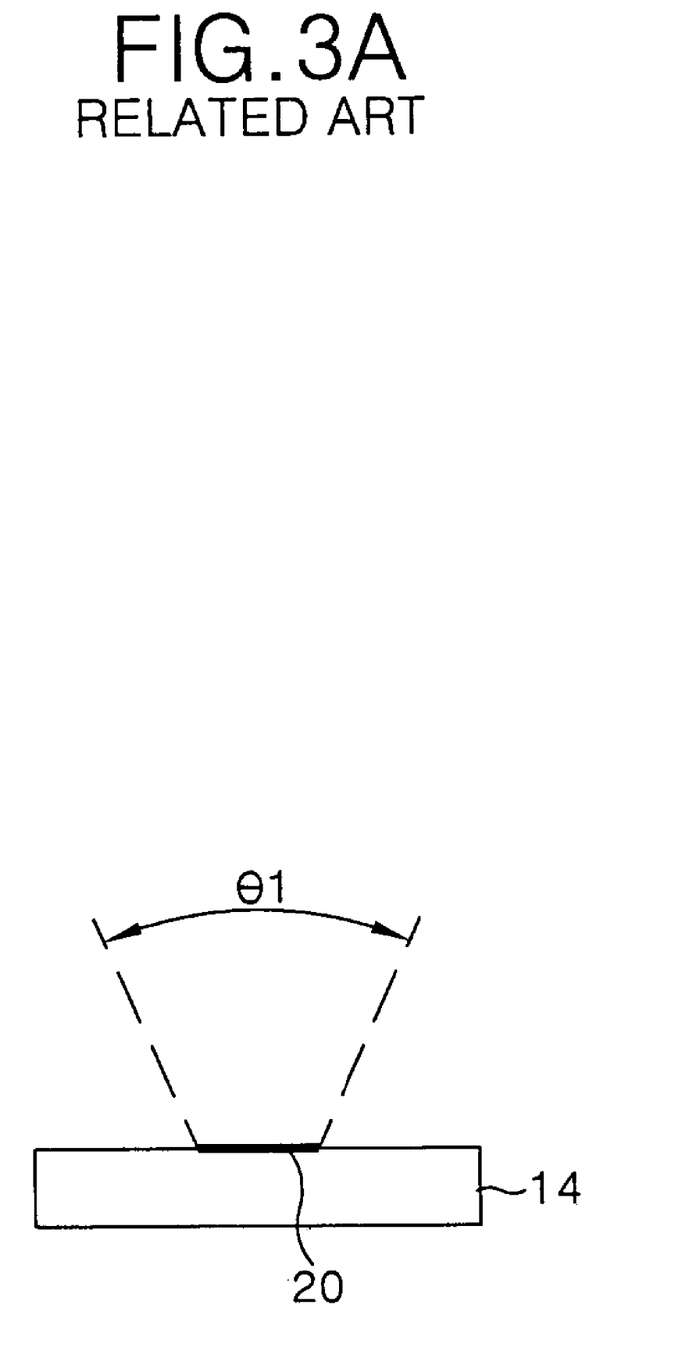
FIG. 3A is a front view of the light emitting diode package viewed from a direction A shown in FIG. 2.
Figure 3B:
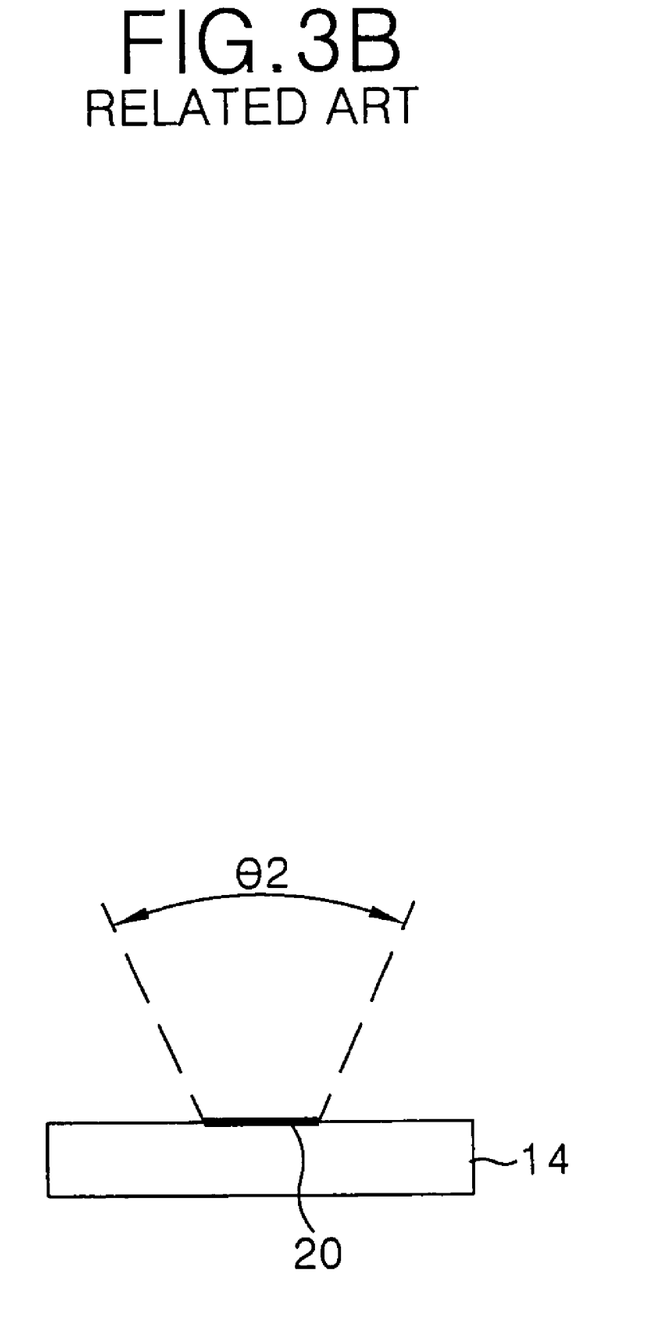
FIG. 3B is a side view of the light emitting diode package viewed from a direction B shown in FIG. 2.

FIG. 3A is a front view of the light emitting diode package viewed from a direction A shown in FIG. 2. FIG. 3B is a side view of the light emitting diode package viewed from a direction B shown in FIG. 2. As described above, a direct back light unit using the LED in the LCD according to the related art radiates the light, which radiates from the LED packages 14 mounted on a plurality of the PCBs 12, to a rear surface of the liquid crystal panel (not shown). However, as shown in FIGS. 3A and 3B, the radiation angle ranges θ1 and θ2 radiated from the LED package 14 have a maximum angle range of 120°. The radiation angle range θ1 at the front surface of the LED package 14 is the same as the radiation angle θ2 at a side surface of the LED package 14. This is because the radiation plate 20 has a circular shape. Accordingly, as the light generated from the LED chip 22 passes through the radiation plate 20, the radiation angle ranges in both dimensions are the same.

Figure 4A:
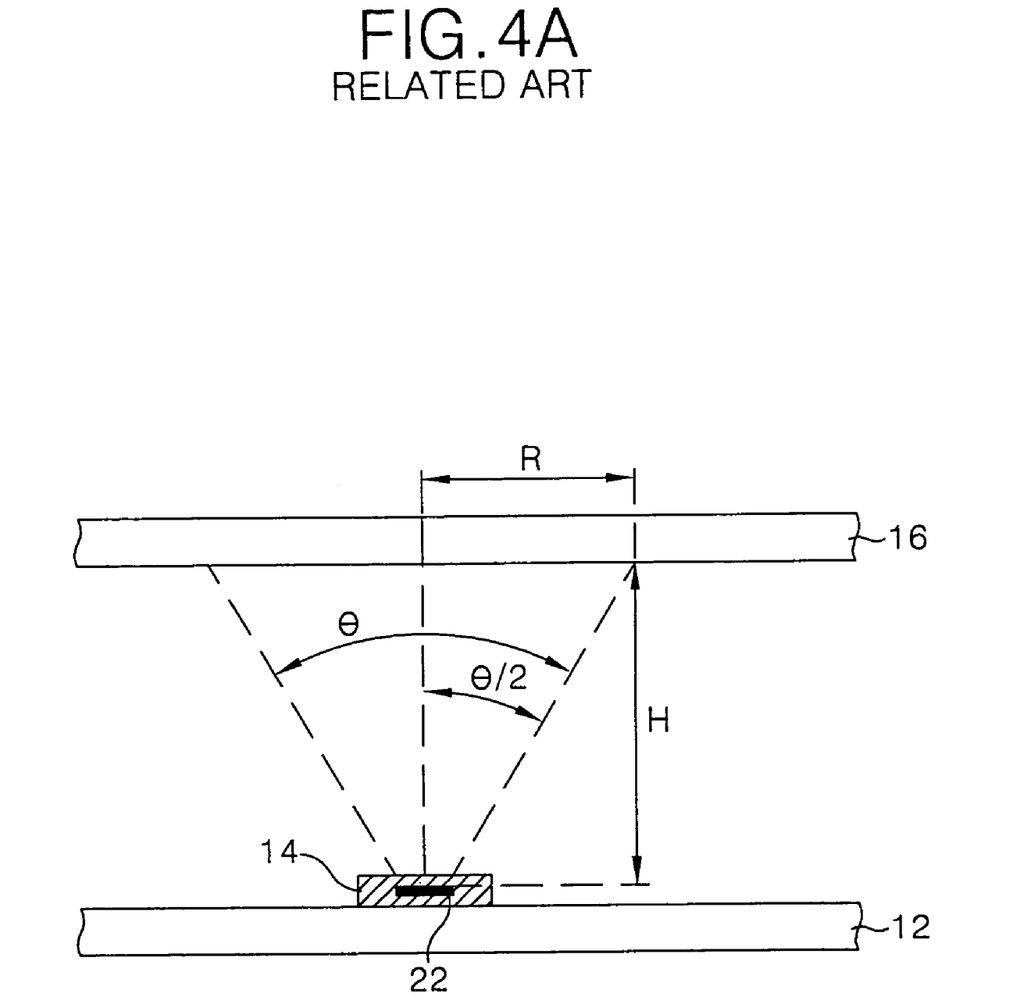
FIG. 4A is a side view of the irradiated area on the diffusion plate due to the light radiated from the light emitting diode package shown in FIG. 1.
Figure 4B:
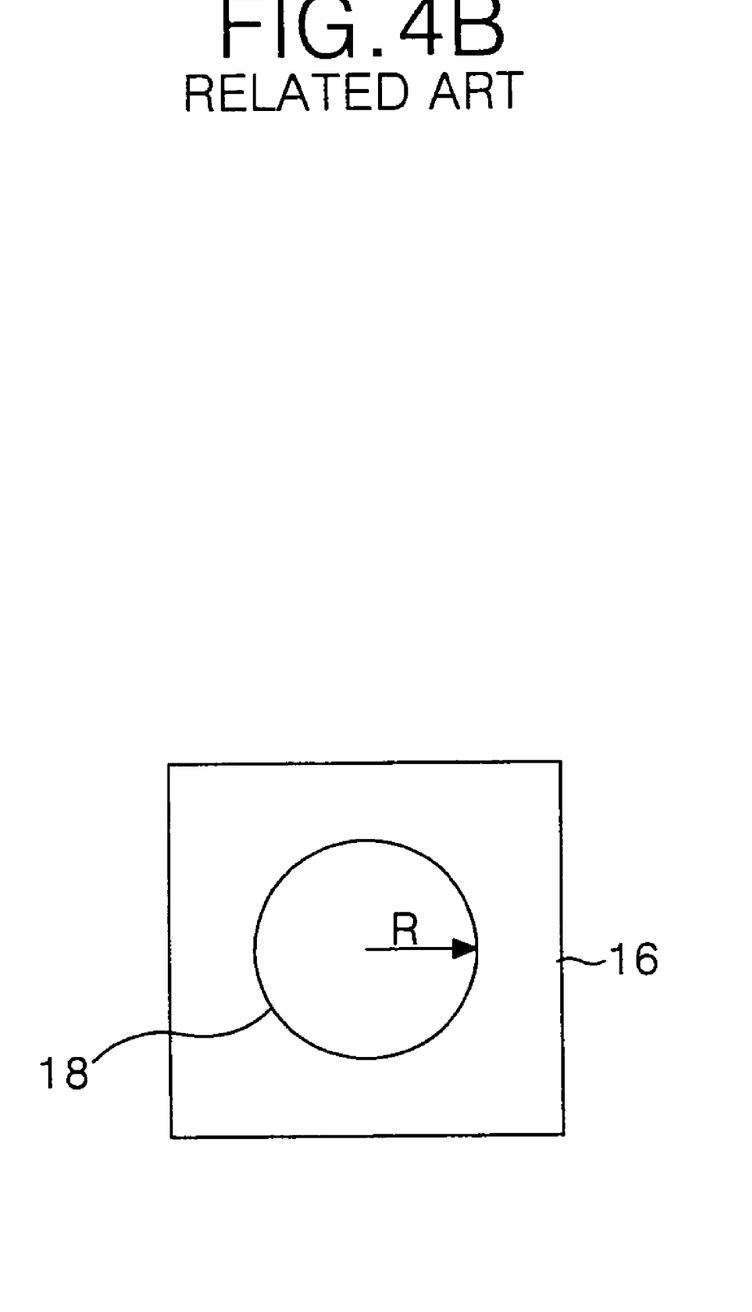
FIG. 4B is a plan view of the irradiated area on the diffusion plate due to the light radiated from the light emitting diode package shown in FIG. 1.

FIG. 4A is a side view of the irradiated area on the diffusion plate due to the light radiated from the light emitting diode package shown in FIG. 1. FIG. 4B is a plan view of the irradiated area on the diffusion plate due to the light radiated from the light emitting diode package shown in FIG. 1. As shown in FIGS. 4A and 4B, a radius (R) of an irradiated area 18 due to the radiated light from the LED package 14 can be determined using EQUATION 1 below.

$$A \text{ radius } (R) \text{ of a irradiated size} = H \times \text{Tan}(\theta/2) \quad [\text{EQUATION 1}]$$

In EQUATION 1, H is a height between the LED chip 22 and the diffusion plate 16 and θ is a radiation angle of light passing through the radiation plate 20. Therefore, the irradiated area size (S) can be determined using a EQUATION 2 as below.

$$A \text{ irradiated size } (S) = \pi \times R^2 \quad [\text{EQUATION 2}]$$

For example, if a radiation angle is 120° and H is 30 mm, then the irradiated area size 18 irradiated on the rear of the diffusion plate 16 by one of the LED package 14 is calculated as $\pi \times (30 \times \text{Tan}(120/2))^2$, which results in a value of 8432 mm².

Accordingly, a direct back light unit using the LED in the LCD according to the related art can require a large number of the LED packages 14 depending on the size of LCD. More power is used and more is generated as the number of LED packages increases. Thus, there is a need to reduce the number of the LED packages 14 used for a direct back light unit in a LCD.

SUMMARY OF THE INVENTION

Accordingly, the present invention is directed to a liquid crystal display device using a light emitting diode that substantially obviates one or more of the problems due to limitations and disadvantages of the related art.

Accordingly, it is an object of the present invention to provide a liquid crystal display device that has a reduced number of light emitting diodes used for a light source in the liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a liquid crystal display device using a light emitting diode includes a light emitting diode and a radiation plate having an asymmetric shape for making outgoing angle ranges of light exiting from the LED chip different depending on which portion of the asymmetric shaped radiation plate reflected the light.

In another aspect, a back light for a liquid crystal display device includes a light emitting diode, a radiation plate having an oval shape, a mold material enclosing the light emitting diode, and a side surface and a rear surface of the radiation plate to form a light emitting diode package.

In yet another aspect, a liquid crystal display device includes: a printed circuit board, a plurality of the light emitting diode packages each having an oval-shaped radiation plate, wherein the light emitting packages are mounted in parallel with each other on the printed circuit board; a diffusion plate positioned over the printed circuit board; and a liquid crystal panel positioned over the diffusion plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 5:
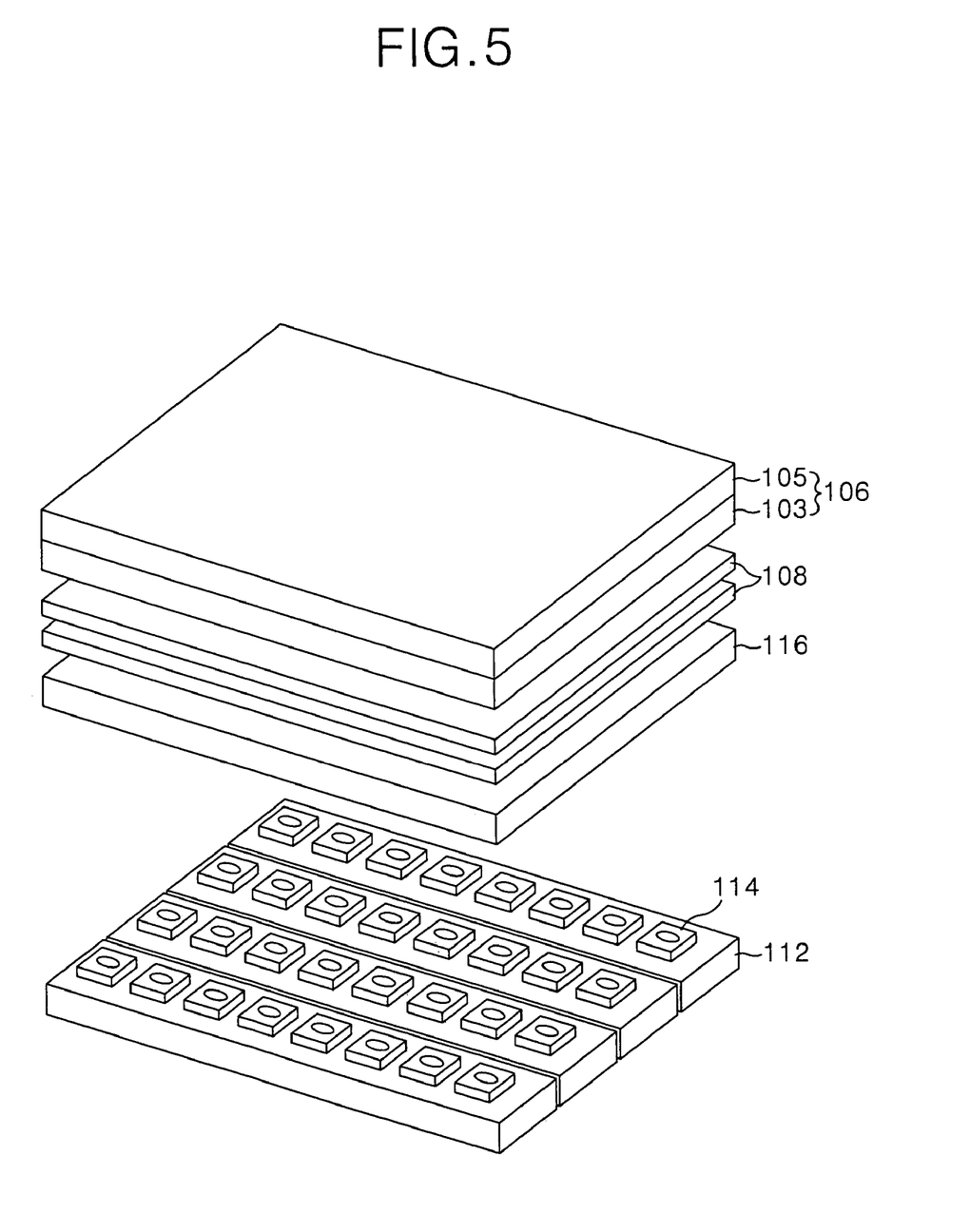
FIG. 5 is a perspective view of a liquid crystal display device using an emitting light diode according to an embodiment of the present invention.
Figure 6:
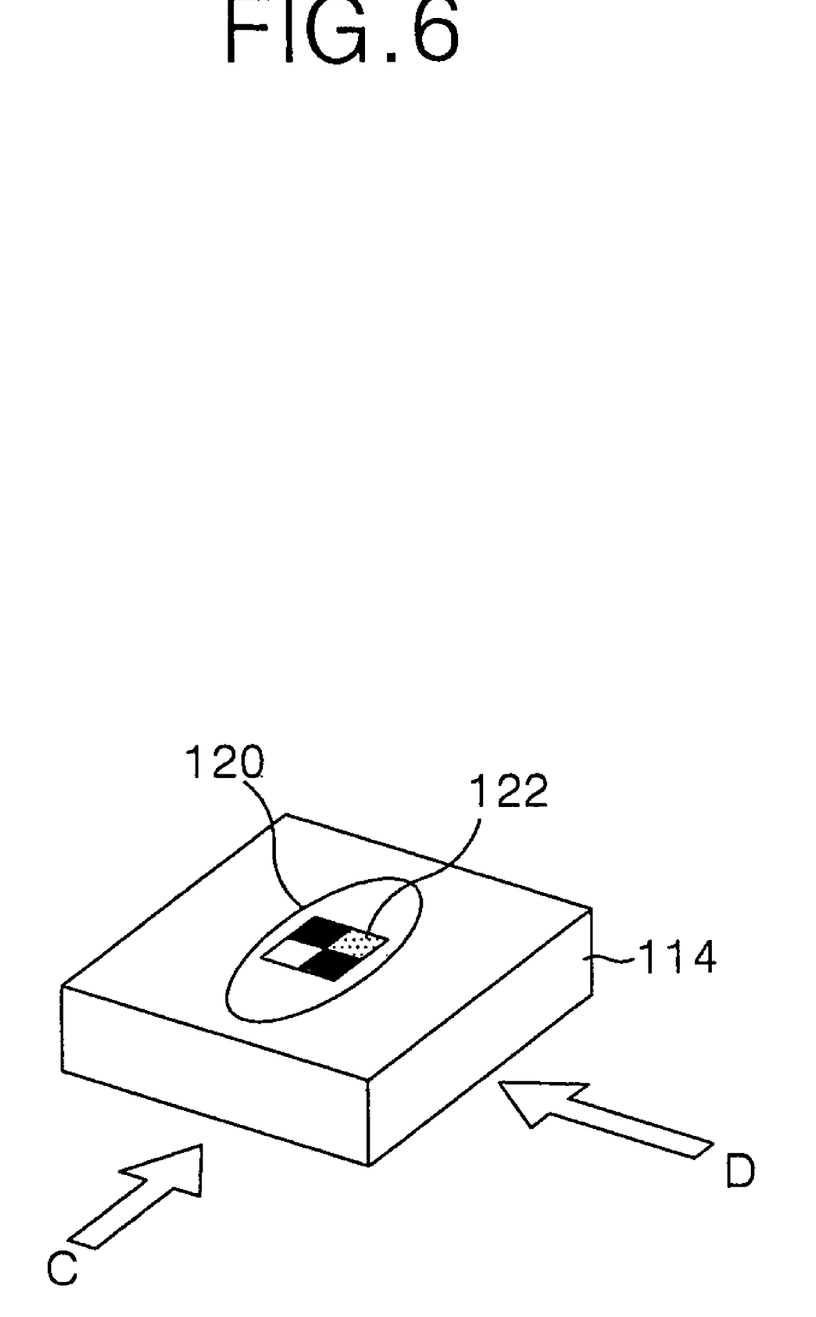
FIG. 6 is a perspective view of the emitting light diode package shown in FIG. 5.

FIG. 5 is a perspective view of a liquid crystal display device using an emitting light diode according to an embodiment of the present invention. FIG. 6 is a perspective view of the emitting light diode package shown in FIG. 5.

Referring to FIG. 5 and FIG. 6, a liquid crystal display device using a light emitting diode according to an embodiment of the present invention comprises a direct back light unit for radiating light on a liquid crystal panel 106 using a liquid crystal panel 106 and a light emitting diode (LED). The liquid crystal panel 106 includes an upper substrate 105 and a lower substrate 103. A liquid crystal (not shown) is injected between the upper substrate 105 and the lower substrate 103.

Signal lines, such as a data line and a gate line, etc. (not shown), are formed on the lower substrate 103 of the liquid crystal panel 106. A thin film transistor (TFT) is formed adjacent to a data line and a gate line that cross each other. The TFT switches a data signal transmitted from the data line to the liquid crystal cell in response to a scanning pulse (i.e., a gate pulse) from the gate line. A pixel electrode is formed at a pixel area between the data line and the gate line. One side of the lower substrate 103 is provided with a pad area connected to the data line and the gate line. A tape carrier package having a driver integrated circuit mounted thereon for applying a driving signal to the TFT is attached to the pad area. This tape carrier package supplies data signals and scanning signals from a driver integrated circuit to the data lines and the gate lines, respectively.

An upper polarizing sheet (not shown) is attached to the upper substrate 105 in the liquid crystal panel 106 while a lower polarizing sheet (not shown) is attached to the rear side of the lower substrate 103 in the liquid crystal panel 106. The upper and lower polarizing sheets enlarge the viewing angle of a picture displayed by a liquid crystal cell matrix. The liquid crystal panel 106 is provided with spacers (not shown) for constantly keeping a gap between the upper substrate 105 and the lower substrate 103.

A direct back light unit comprises a plurality of LED packages 114 for generating light, a printed circuit board (PCB) 112 in which a plurality of the LED packages 114 are mounted at identical intervals and a diffusion plate 116 for diffusing the light emitted from the the LED packages 114, and at least one optical sheet 108 for directing the light radiated from the diffusion plate 116 onto the liquid crystal panel 106.

Each of the LED packages 114 includes a LED chip 122 for generating light, a radiation plate 120 having an oval shape, which is formed on the front surface of the LED chip 122 to outwardly reflect the light generated from the LED chip 122, and a mold material for packaging the LED chip 122, as shown in FIG. 6. The mold material encloses the LED chip 122 and the radiation plate 120 to protect the LED chip 122 and the radiation plate 120. The LED chip 122 generates red light, green light and blue light or white light as a point light source. Such a LED chip 122 has a red LED, a green LED and a blue LED to generate red light, green light and blue light, or white light.

The radiation plate 120 has an asymmetric shape so that outgoing angle ranges of light exiting from the LED chip 122 are different depending on which portion of the asymmetric shaped radiation plate reflected the light. That is, the radiation plate 120 formed on the front surface of the LED chip 122 has, for example, an oval shape, to thereby reflect an amount of light emitted by the LED chip 122 at a designated angle in one direction and another amount of light in another designated direction.

Each of the PCBs 112 is arranged at identical intervals on a rear surface of the diffusion plate 116 and is made of a metal to disperse heat generated when driving the LED chips 122. A controller for controlling a luminescence of the LED chips 122 is mounted on each of the PCBs 12. Each of the PCBs 112 supports its corresponding LED chip 122.

The diffusion plate 116 is arranged over the LED package 114 at a predetermined height so that the light radiated from the LED package 114 is consistently distributed across the diffusion plate 116. The diffusion plate 116 redirects the light radiated from the LED package 114 toward a liquid crystal panel 106 and causes the light incident on the liquid crystal panel to have a wide angle. The diffusion plate 116 includes a transparent resin film whose sides are coated with light-diffusion materials. An optical sheet 108 improves an efficiency of the light exiting from the diffusion plate 116, to thereby causes the light to radiate onto the liquid crystal panel 106. As shown in FIG. 5, more than one optical sheet can be used.

Figure 7A:
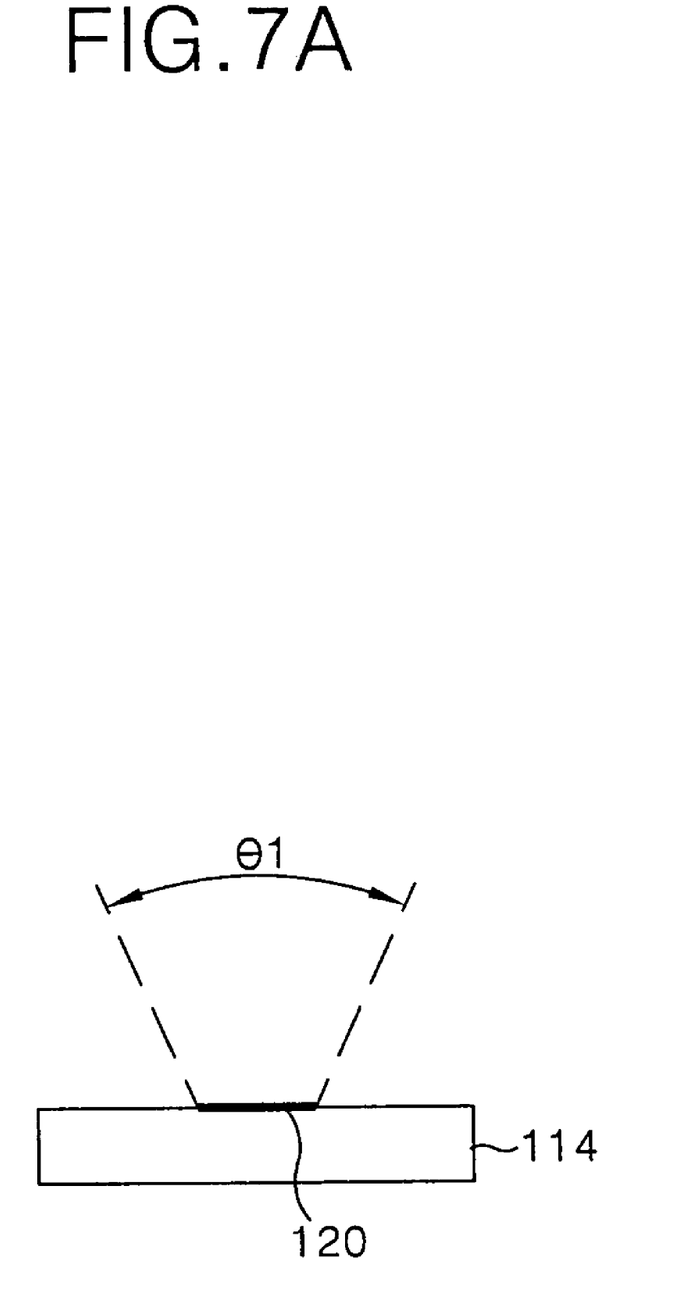
FIG. 7A is a front view of the light emitting diode package viewed from direction C shown in FIG. 6.
Figure 7B:
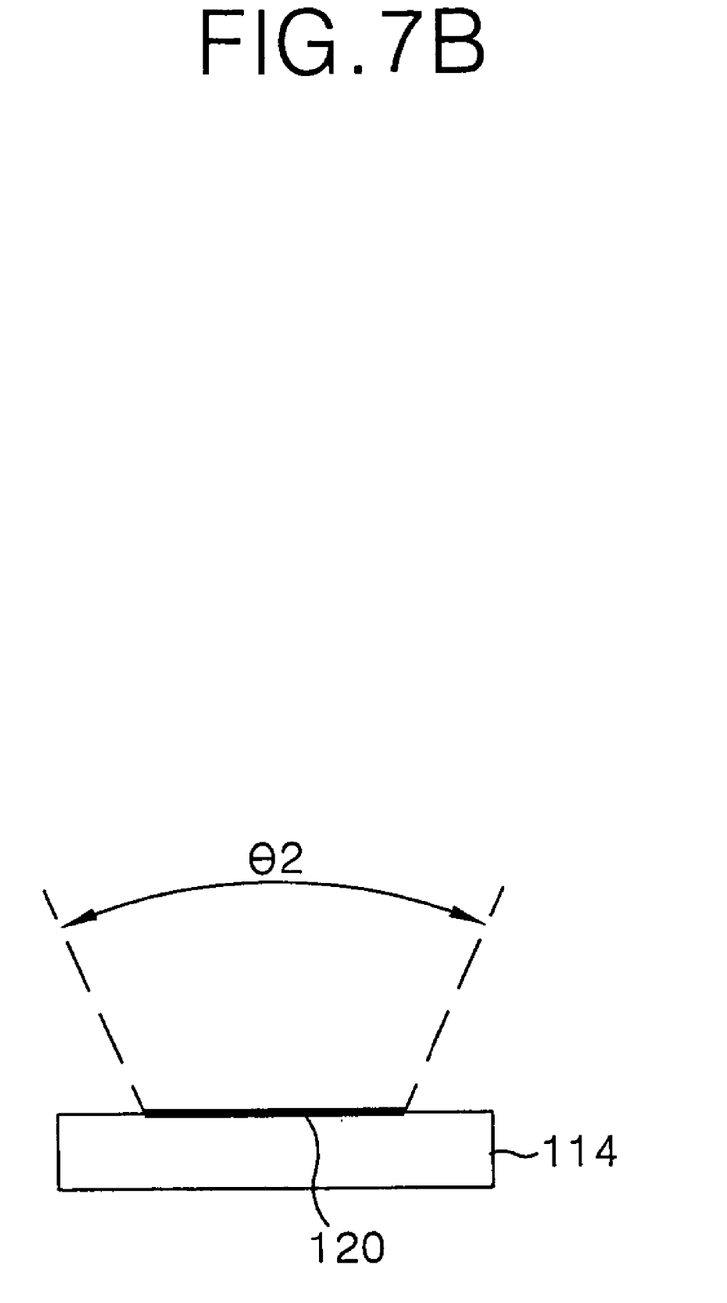
FIG. 7B is a side view of the light emitting diode package viewed from direction D shown in FIG. 6.

FIG. 7A is a front view of the light emitting diode package viewed from direction C shown in FIG. 6 and FIG. 7B is a side view of the light emitting diode package viewed from direction D shown in FIG. 6. Employing the LED according to the embodiment of the present invention irradiates light from a plurality of the LED packages 114 mounted on a plurality of the PCBs 112, to a rear surface of the liquid crystal panel (not shown). As shown in FIGS. 7A and 7B, the short axis radiation angle range θ1 of the radiation plate 120 is different from the long axis radiation angle range θ2 of the radiation plate 120. Because the radiation plate 120 has an oval shape, the light generated from the LED chip 122 is radiated on a wider range of area on the diffusion plate 116. For example, a short axis radiation angle range θ1 of the light radiated from the LED package 114 becomes more than 70° (about 70°~130°) and a long axis radiation angle range θ2 becomes more than 120° (about 120°~170°). If the short axis radiation angle range θ1 is more than 130° and the long axis radiation angle range θ2 is more than 170°, the light emitted from an adjacent LED packages 114 overlap each other. The luminescence of the overlapped parts becomes higher in comparison to other parts that do not have overlapping light from adjacent LED packages 114.

A liquid crystal display device according to embodiments of the present invention causes the irradiated surface area (S) of the light radiated onto the diffusion plate 116 to be larger than the irradiated area of the related art by employing asymmetrical shape, such as an oval shape. Because the irradiated surface area (S) of one LED package 114 in the liquid crystal display device according to embodiments of the present invention is wider than that in the related art. Accordingly, the liquid crystal display device according to embodiments of the present invention are capable of reducing the number of the LED packages 114.

Figure 8:
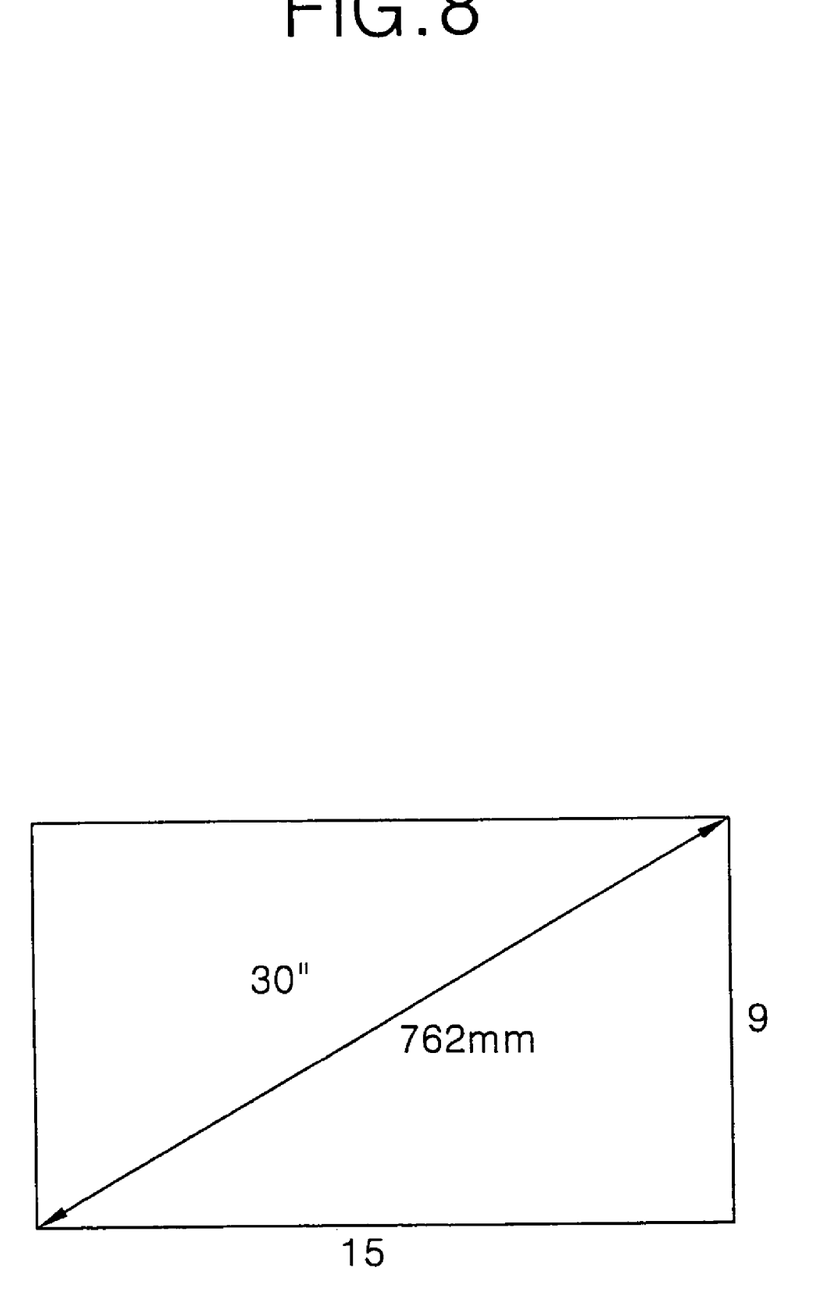
FIG. 8 is a plan view of a liquid crystal panel.

In a case where an LED package 114 having a oval-shaped radiation plate 120 is used for a liquid crystal panel whose screen ratio is 15:9 as shown in FIG. 8, an irradiated surface area (S) and the number of required LEDs depending on the short axis and the long axis radiation angle ranges θ1 and θ2 of the radiation plate 120 of the oval type will be explained with regard the following tables.

TABLE 1

| θ1: short axis radiation angle range of oval | | | | height (H): 29 mm | | | | |
|---|---|---|---|---|---|---|---|---|
| θ2: long axis radiation angle range of oval | | | | size of 30": 136,088 mm² | | | | |
| long R: long axis focal distance of oval | | | | θ1: 90° | | | | |
| short R: short axis focal distance of oval | | | | short R: 29 mm | | | | |
| θ2 | 120° | 125° | 130° | 135° | 140° | 145° | 150° | 155° | 160° |
| long R | 50.2295 | 55.7085 | 62.1907 | 70.0122 | 79.6768 | 91.9762 | 108.229 | 130.811 | 164.476 |
| size(S) | 4576.22 | 5075.39 | 5665.54 | 6378.54 | 7259.05 | 8379.61 | 9860.37 | 11917.7 | 14984 |
| ratio of size | 29.7382 | 26.8134 | 24.0186 | 21.3353 | 18.7474 | 16.2404 | 13.8015 | 11.4191 | 9.0823 |
| number of LED | 30 | 27 | 25 | 22 | 19 | 17 | 14 | 12 | 10 |

Table 1 represents values such as a long axis focal distance (long R), an irradiated area size (S), a ratio size of the panel area size to the irradiated area size, number of LED packages of an oval-shaped radiation plate 120 according to a long axis radiation angle range θ2. The height (H) refers a distance between the LED chip 122 and the diffusion plate 116, θ1 refers a short radiation angle range of an oval-shaped radiation plate 120, and short R refers a short axis focal distance of the oval-shaped radiation plate 120. In Table 1, the height (H) between the LED chip 122 and the diffusion plate 116 is 29 mm, the short axis radiation angle range θ1 of the oval-shaped radiation plate 120 is 90°, and the short focal distance (short R) is 29 mm.

As indicated in Table 1, as a long axis radiation angle range θ2 of the oval-shaped radiation plate 120 is gradually increased, for example, 120°, 125°, 130°, 135°, 140°, 145° and 160°, a long axis focal distance (short R) and an irradiated area size for the oval-shaped radiation plate 120 increases while the ratio of size and the number of LED packages decreases.

If the height (H) between the LED chip 122 and the diffusion plate 116 is 29 mm, the short axis radiation angle range θ1 of the oval type radiation plate 120 is 100° and short focal distance (short R) is 34.5609 mm, the variations of the long axis focal distance (long R), the irradiated area size (S), the ratio of size and the number of LED packages of the oval type radiation plate 120 according to a long axis radiation angle range θ2 of the radiation plate 120 will be illustrated in Table 2 below.

TABLE 2

| | θ1: short axis radiation angle range of oval<br>θ2: long axis radiation angle range of oval<br>long R: long axis focal distance of oval<br>short R: short axis focal distance of oval | | | | | height (H): 29 mm<br>size of 30": 136,088 mm$^2$<br>θ1: 100°<br>short R: 34.5609 mm | | | |
|---|---|---|---|---|---|---|---|---|---|
| θ2 | 120° | 125° | 130° | 135° | 140° | 145° | 150° | 155° | 160° |
| long R | 50.2295 | 55.7085 | 62.1907 | 70.0122 | 79.6768 | 91.9762 | 108.229 | 130.811 | 164.476 |
| size(S) | 5453.72 | 6048.61 | 6752.43 | 7601.65 | 8651 | 9986.42 | 11751.1 | 14202.9 | 17857.2 |
| ratio of size | 24.9533 | 22.4991 | 20.154 | 17.9025 | 15.7309 | 13.6273 | 11.5809 | 9.58173 | 7.62092 |
| number of LED | 25 | 23 | 21 | 18 | 16 | 14 | 12 | 10 | 8 |

Table 2 shows that as a long axis radiation angle range θ2 of the oval type radiation plate 120 is gradually increased, for example, 120°, 125°, 130°, 135°, 140°, 145° and 160°, the long axis focal distance (short R) and the irradiated area of the oval type radiation plate 120 increases and the ratio of size and the number of LED packages decreases.

If the height (H) between the LED chip 122 and the diffusion plate 116 is 29 mm, the short axis radiation angle range θ1 of the oval-shaped radiation plate 120 is 110° and the short focal distance (short R) is 41.4163 mm, the change of the long axis focal distance (long R), the irradiated area size (S), the ratio of size and the number of LED packages of the oval type radiation plate 120 according to the long axis radiation angle range θ2 of the radiation plate 120 are shown in Table 3 below.

Table 3 shows that as the long axis radiation angle range θ2 of the oval type radiation plate 120 is gradually increased, for example, 120°, 125°, 130°, 135°, 140°, 145° and 160°, the long axis focal distance (short R) and the irradiated area size of the oval-shaped radiation plate 120 increases and the ratio of size and the number of LED packages decreases.

If the height (H) between the LED chip 122 and the diffusion plate 116 is 29 mm, the short axis radiation angle range θ1 of the oval type radiation plate 120 is 120° and the short focal distance (short R) is 50.2295 mm, the change of the long axis focal distance (long R), the irradiated area size (S), the ratio of size and the number of LED packages of the oval-shaped radiation plate 120 according to the long axis

TABLE 3

| | θ1: short axis radiation angle range of oval<br>θ2: long axis radiation angle range of oval<br>long R: long axis focal distance of oval<br>short R: short axis focal distance of oval | | | | | height (H): 29 mm<br>size of 30": 136,088 mm$^2$<br>θ1: 110°<br>short R: 41.4163 mm | | | |
|---|---|---|---|---|---|---|---|---|---|
| θ2 | 120° | 125° | 130° | 135° | 140° | 145° | 150° | 155° | 160° |
| long R | 50.2295 | 55.7085 | 62.1907 | 70.0122 | 79.6768 | 91.9762 | 108.229 | 130.811 | 164.476 |
| size(S) | 6535.51 | 7248.4 | 8091.83 | 9109.5 | 10367 | 11967.3 | 14082.1 | 17020.2 | 21399.3 |
| ratio of size | 20.8229 | 18.775 | 16.818 | 14.9392 | 13.1271 | 11.3717 | 9.66395 | 7.99572 | 6.35947 |
| number of LED | 21 | 19 | 17 | 15 | 14 | 12 | 10 | 8 | 7 | radiation angle range θ2 of the radiation plate 120 are shown in Table 4 below.

TABLE 4

| | θ1: short axis radiation angle range of oval<br>θ2: long axis radiation angle range of oval<br>long R: long axis focal distance of oval<br>short R: short axis focal distance of oval | | | | | height (H): 29 mm<br>size of 30": 136,088 mm$^2$<br>θ1: 120°<br>short R: 50.2295 mm | | | |
|---|---|---|---|---|---|---|---|---|---|
| θ2 | 120° | 125° | 130° | 135° | 140° | 145° | 150° | 155° | 160° |
| long R | 50.2295 | 55.7085 | 62.1907 | 70.0122 | 79.6768 | 91.9762 | 108.229 | 130.811 | 164.476 |
| size(S) | 7926.24 | 8790.83 | 9813.73 | 11048 | 12573 | 14513.9 | 17078.7 | 20642 | 25953 |
| ratio of size | 17.1694 | 15.4807 | 13.8672 | 12.318 | 108238 | 9.37642 | 7.96833 | 6.5928 | 5.24365 |
| number of LED | 18 | 16 | 14 | 13 | 11 | 10 | 8 | 7 | 6 |

Table 4 shows that as the long axis radiation angle range θ2 of the oval type radiation plate 120 is gradually increased, for example, 120°, 125°, 130°, 135°, 140°, 145° and 160°, the long axis focal distance (short R) and the irradiated area size of the oval-shaped radiation plate 120 increase, the ratio of size and the number of LED packages decrease.

Table 5 below represents a decreased number of the LEDs in the present invention in comparison with the round type radiation plate of the related art according to a short radiation angle range θ1 of the oval-shaped radiation plate 120 and the long axis radiation angle range θ2 of the radiation plate 120.

TABLE 5

| number of LED according to long axis and short axis radiation angle ranges | XX is the decreased number of LED in comparison to the circular-shaped radiation plate of the related art | | | | | | | |
|---|---|---|---|---|---|---|---|---|
| short axis radiation angle range | long axis radiation angle range | | | | | | | |
| | 120° | 125° | 130° | 135° | 140° | 145° | 150° | 155° | 160° |
| 90° | 30 | 27 | 25 | 22 | 19 | 17 | 14 | 12 | 10 |
| 100° | 25 | 23 | 21 | 18 | 16 | 14 | 12 | 10 | 8 |
| 110° | 21 | 19 | 17 | 15 | 14 | 12 | 10 | 8 | 7 |
| 120° | 18 | 16 | 14 | 13 | 11 | 10 | 8 | 7 | 6 |

As shown in Table 5, the LCD according to embodiments of the present invention, as the short radiation angle range θ1 of the oval-shaped radiation plate 120 and the long axis radiation angle range θ2 of the oval-shaped radiation plate 120 increase, the required number of LEDs decreases. Accordingly, the LCD according to embodiments of the present invention is capable of reducing the number of LEDs in comparison to the related art LED.

As described above, a liquid crystal display device according to the present invention comprises a LED package having a oval-shaped radiation plate. As the long axis radiation angle range θ2 of the oval radiation plate 120 becomes larger than 120°, which is the radiation angle in the related art circular-shaped radiation plate, the radiated area size of one LED package 114 becomes larger. Since a radiated area size of each LED package can be increased, the number of the LED packages can be reduced. In other words, the LCD according to the present invention enables an increase in irradiated surface area by adjusting the radiation angle of the LED package, to thereby reduce the number of the LED packages used for a back light of a liquid crystal panel.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device using a light emitting diode comprising:
    a light emitting diode; and
    a radiation plate having a substantially asymmetric shape for making outgoing angle ranges of light exiting from the LED chip different depending on which portion of the substantially asymmetrically shaped radiation plate reflected the lights,
    wherein an outgoing angle range of light exiting from a long axis portion of the radiation plate has a range within about 120° to about 170°.

2. The liquid crystal display device using a light emitting diode according to claim 1, further comprising a mold material enclosing the light emitting diode, and a side surface and a rear surface of the radiation plate.

3. The liquid crystal display device using a light emitting diode according to claim 2, further comprising:
    a light emitting diode package including the light emitting diode, the radiation plate and the mold material; and
    a printed circuit board supporting the light emitting diode package and having a controlling circuit mounted thereon for controlling luminescence of the light emitting diode.

4. The liquid crystal display device using a light emitting diode according to claim 3, further comprising:
    a diffusion plate arranged over the printed circuit board;
    an optical sheet on the diffusion plate; and
    a liquid crystal panel arranged over the optical sheet.

5. The liquid crystal display device using a light emitting diode according to claim 4, wherein a plurality of the printed circuit boards is arranged under the diffusion plate.

6. The liquid crystal display device using a light emitting diode according to claim 3, wherein a plurality of the light emitting diode packages is mounted substantially in parallel with each other on the printed circuit board.

7. The liquid crystal display device using a light emitting diode according to claim 3, wherein the printed circuit board is made of a metal to disperse heat generated from the light emitting diode.

8. The liquid crystal display device using a light emitting diode according to claim 3, wherein the light emitting diode package generates red light, green light and blue light.

9. The liquid crystal display device using a light emitting diode according to claim 3, wherein the light emitting diode package generates white light.

10. The liquid crystal display device using a light emitting diode according to claim 1, wherein an outgoing angle range of light exiting from a short axis portion of the radiation plate has a range within about 70° to about 130°.

11. The liquid crystal display device using a light emitting diode according to claim 1, wherein the radiation plate has a substantially oval shape.

12. The liquid crystal display device using a light emitting diode according to claim 1, wherein the light emitting diode includes red, green and blue light emitting diodes.

13. A back light for a liquid crystal display device comprising:
    a light emitting diode;
    a radiation plate having a substantially oval shape;
    a mold material enclosing the light emitting diode, and a side surface and a rear surface of the radiation plate to form a light emitting diode package,
    wherein an outgoing angle range of light exiting from a long axis portion of the radiation plate has a range within about 120° to about 170°.

14. The back light according to claim 13, wherein an outgoing angle range of light exiting from a short axis portion of the radiation plate has a range within about 70° to about 130°.

15. A liquid crystal display device comprising:
    a printed circuit board;
    a plurality of the light emitting diode packages each having a substantially oval-shaped radiation plate, wherein the light emitting packages are mounted substantially in parallel with each other on the printed circuit board;

a diffusion plate positioned over the printed circuit board; and a liquid crystal panel positioned over the diffusion plates, wherein an outgoing angle range of light exiting from a long axis portion of the radiation plate has a range within about 120° to about 170°.

16. The liquid crystal display device according to claim 15, wherein an outgoing angle range of light exiting from a short axis portion of the radiation plate has a range within about 70° to about 130°.

17. The liquid crystal display device according to claim 15, wherein the printed circuit board is made of a metal to disperse heat generated from the light emitting diode.

18. The liquid crystal display device using a light emitting diode according to claim 4, wherein the height (H) between the light emitting diode chip and the diffusion plate is about 29 mm.

19. The backlight for a liquid crystal display device according to claim 13, further comprising a light emitting diode chip and a diffusion plate wherein the height (H) between the light emitting diode chip and the diffusion plate is about 29 mm.

20. The liquid crystal display device according to claim 15, further comprising a light emitting diode chip and a diffusion plate wherein the height (H) between the light emitting diode chip and the diffusion plate is about 29 mm.

* * * * *